United States Patent [19]

Yamauchi

[11] Patent Number: 5,233,697
[45] Date of Patent: Aug. 3, 1993

[54] PLC PROCESSOR AND PLC

[75] Inventor: Takashi Yamauchi, Minamitsuru, Japan

[73] Assignee: Fanuc Ltd., Minamitsuru, Japan

[21] Appl. No.: 659,550

[22] Filed: Feb. 25, 1991

Related U.S. Application Data

[63] Continuation of Ser. No. 273,511, Oct. 25, 1988, abandoned.

[30] Foreign Application Priority Data

Mar. 3, 1987 [JP] Japan ............................ 048408/1987

[51] Int. Cl.⁵ .......................................... G06F 9/305
[52] U.S. Cl. ............................. 395/375; 364/DIG. 2; 364/946.2; 364/947; 364/949
[58] Field of Search ........................ 395/375, 775; 364/200 MS File, 900 MS File

[56] References Cited

U.S. PATENT DOCUMENTS

| | | | |
|---|---|---|---|
| 3,753,243 | 8/1973 | Ricketts, Jr. et al. | 395/775 |
| 3,996,565 | 12/1976 | Nakao et al. | 364/900 |
| 4,162,480 | 7/1979 | Berlekamp | 364/200 |
| 4,287,559 | 9/1981 | Easley et al. | 364/900 |
| 4,390,966 | 6/1983 | Kawashima et al. | 364/900 |
| 4,471,461 | 9/1984 | Boone | 364/900 |
| 4,675,843 | 6/1987 | Vautier | 364/900 |
| 5,053,954 | 10/1991 | Miyoshi | 395/375 |

FOREIGN PATENT DOCUMENTS 2268303 11/1975 France .
1493319 11/1977 United Kingdom .

OTHER PUBLICATIONS

Supplementary European Search Report for EP-88-9-0-1928, The Hague, Aug. 23, 1990.

Primary Examiner—Debra A. Chun
Attorney, Agent, or Firm—Staas & Haley

[57] ABSTRACT

A PLC (programmable logic controller) processor which carries out logical operations. The processor comprises a logical operation unit (2) for executing a logical operation, a jump inhibition unit (3), a jump condition checking unit (4) for checking whether or not a jump can be carried out while omitting executions of subsequent instructions, and a jump instruction execution unit (5) for executing the jump instruction. When the result of the checking by the jump condition checking means (4) indicates that subsequent instructions need not be executed and the jump should be carried out, the jump instruction execution means executes the jump, whereby unnecessary instructions are not executed, thus the speed of the logical processing is increased.

12 Claims, 6 Drawing Sheets

PLC PROCESSOR AND PLC

This application is a continuation of application Ser. No. 07/273,511, filed Oct. 25, 1988, now abandoned.

FIELD OF THE INVENTION

The present invention relates to a PLC (programmable logic controller) processor for executing logical operations and a PLC, and more particularly to a PLC processor and PLC, in which unnecessary logical operations are omitted to thereby increase the processing speed.

DESCRIPTION OF THE RELATED ART

A PLC (programmable logic controller) is also referred to as a PC (programmable controller) and has been extensively used in machine tools and manufacturing machinery.

Due to the historical grounding that in the PLC logic is assembled by the use of a hardware relay, a logical expression referred to as ladder diagram has been extensively used. Technical personnels who previously used the hardware relays are familiar with the expression of the ladder diagram and are accustomed to designing using such a diagram. Since the logic is visually appealing, it has also been used extensively in PLC systems employing microprocessors.

In PLC systems using microprocessors, a greater number of instruction steps are processed due to enhancement of the microprocessor and to the highly complicated nature of the control subject. Those instructions are required to be processed at real time within a limited period of time as required by the control subject. In view of such circumstances, high-speed processing in the PLC has been strongly required.

Figure 6:
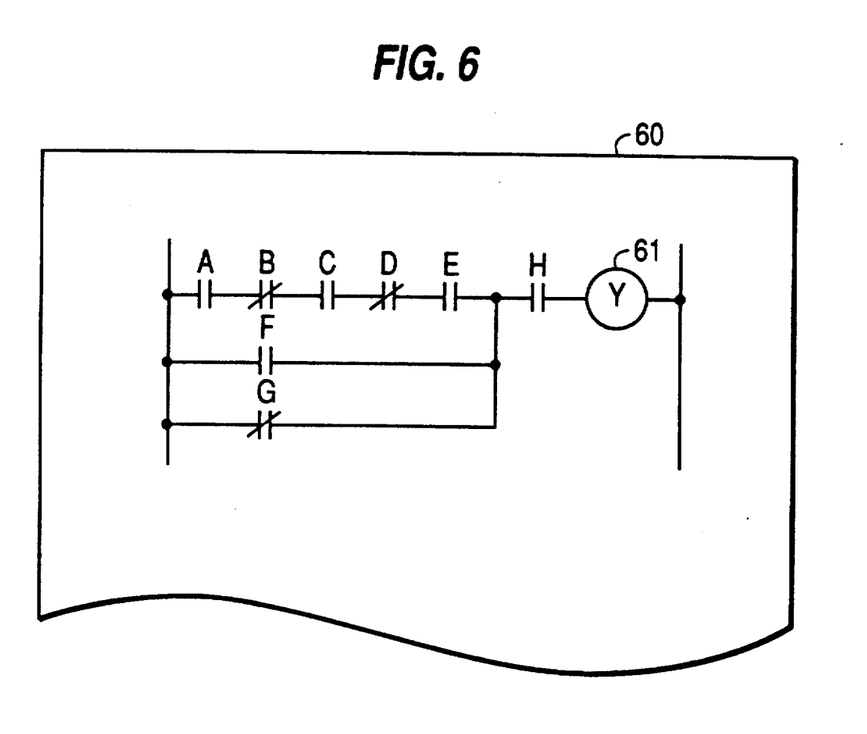
FIG. 6 is a diagram showing an example of a circuit of a ladder diagram.

An example of a ladder diagram is shown in FIG. 6, in which denoted by numeral 60 is a ladder diagram sheet. Logical relay contacts are denoted by characters A, B, C, D, E, F, G and H. Numeral 61 denotes a coil of the logical relay. Such a ladder diagram implements logical processings as indicated below.

|        |        |
|--------|--------|
| RD     | A (1)  |
| AND.NOT| B (2)  |
| AND    | C (3)  |
| AND.NOT| D (4)  |
| AND    | E (5)  |
| OR     | F (6)  |
| OR.NOT | G (7)  |
| AND    | H (8)  |
| WRT    | Y (9)  |

Accordingly, assuming that an average processing period of time of each instruction is t, a period of time 9t is required in total. It has therefore been contemplated that to shorten the processing period of time t one can increase the speed of the processings. The period of time t is determined depending upon hardware of the microprocessor, memories or other components, so that the processing speed cannot be increased more than a predetermined maximum.

However, depending upon the situation, all logical operations need not be implemented in the ladder diagram. In the example shown in FIG. 6, if A is "0" in logical value, then logical operations from (1) to (5) are all "0", so that it is permitted to directly jump to the instruction of (6). As a consequence, the logical operations of (2) through (5) can be omitted and thus the processing period of time can be shortened by 4t.

Conversely assuming that the results of the logical operations in (1) through (5) are all "1" in logical value, then results of the operations of (6) and (7) are "1" in logical value irrespective of the values of F and G. Thus, the logical operations in (6) and (7) can be omitted, and the processing period of time can be shortened by 2t.

Therefore, the processing period of time can be shortened by omitting some operations which are unnecessary under a prescribed situation and jumping to an operation which needs to be executed. Yet, there is a possibility that in commonly used processors, the processing period of time might adversely be prolonged in executing check instructions. As a result, the processing period of not be shortened in all times.

SUMMARY OF THE INVENTION

It is an object of the invention to resolve the above-described drawbacks and to provide a PLC (programmable logic controller) processor and a PLC, in which unnecessary logical operations are omitted by a processor responsive to the same instruction as that for the logical operations and provided with a jump condition checking means for checking, based upon a relationship between the result of a logical operation and the instructions to be subsequently executed, whether or not a jump should be carried out, whereby the processing speed is increased.

It is another object of the invention to provide a high-speed PLC in which logical operations are executed by a high-speed processor and processings other than the logical operations are executed by another all-purpose processor.

According to one aspect of the invention, in order to resolve the above-described drawbacks, there is provided a PLC processor for carrying out logical operations, comprising: jump inhibition means for inhibiting a jump; jump condition checking means for checking whether or not a jump instruction is to be executed based on a relation between a result of a logical operation and instructions to be subsequently executed; and jump instruction execution means for executing the jump after the logical operation in response to conditions of both the jump inhibition means and the jump condition checking means.

According to another aspect of the invention, there is provided a PLC having at least two processors and executing processings, comprising: an exclusive PLC processor including logic operation means for executing a logical operation, jump inhibition means for inhibiting a jump, jump condition checking means for checking whether or not a jump instruction is to be executed based on a relation between a result of a logical operation and instructions to be subsequently executed, and a jump instruction execution means for executing the jump after the logical operation in response to conditions of both the jump inhibition means and the jump condition checking means, wherein the exclusive PLC processor executes logical operations; and a second processor for executing remaining processings.

According to the first aspect of the invention, if the result of a logical operation for an instruction being executed is "1" in logical value, the subsequent OR instructions can be omitted. On the other hand, if the result of the logical operation is "0", the subsequent AND instructions can be omitted. By providing the checking means to the processor which is operable in response to the same type instruction as that of the logical processing, the processing speed as a whole can be increased without need for carrying out special checking processing instructions and by omitting unnecessary instructions.

According to the second aspect of the invention, the processor of the type as referred to in the first aspect of the invention is exclusively used for executing the logical processings and another processor is employed for executing the remaining processings, whereby the processing period of time can further be reduced.

DESCRIPTION OF THE PREFERRED EMBODIMENTS

Embodiments of the invention will be described with reference to the drawings.

(1) Arrangement of Processor

Figure 1:
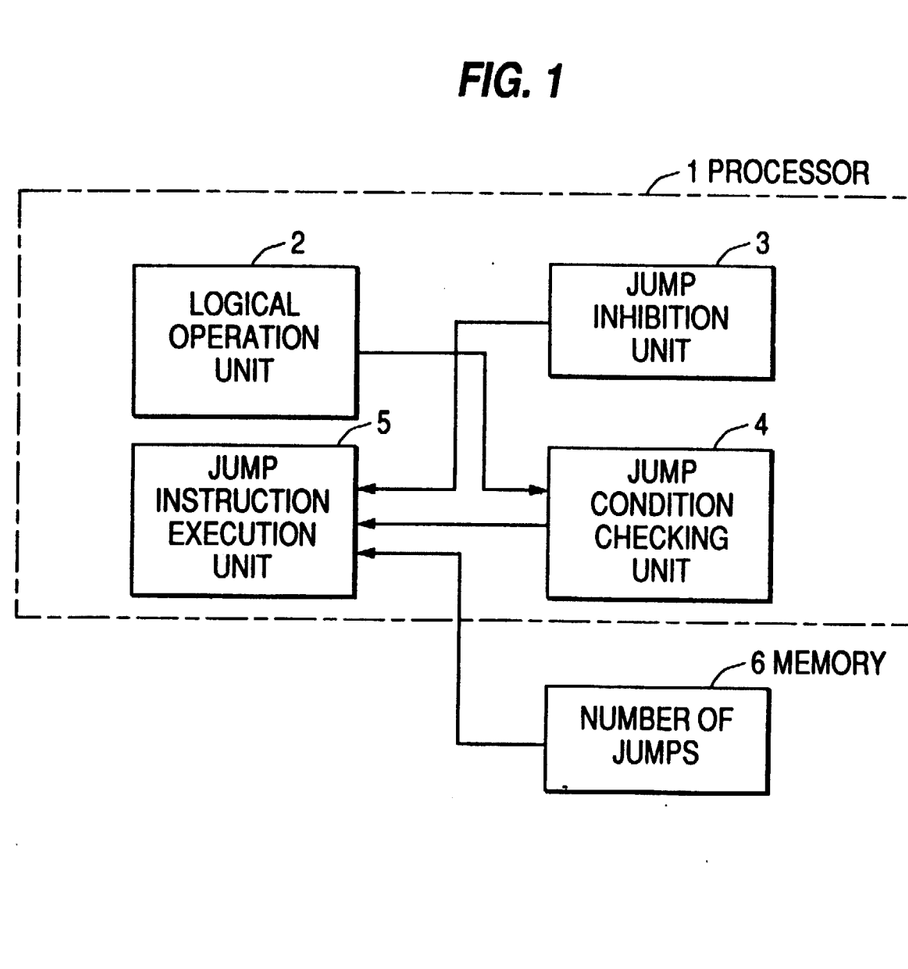
FIG. 1 is a block diagram showing a processor according to one embodiment of the invention.

FIG. 1 is a block diagram showing a processor according to one embodiment of the invention. In the figure, a processor 1 is comprised of logical operation unit 2, jump inhibition unit 3, jump condition checking unit 4 and jump instruction execution unit 5.

The logical operation unit 2 implements logical operations and executes logical operations of AND, OR, NOT, etc. Besides logical operations, the logical operation unit 2 is capable of executing numerical computations.

The jump inhibition unit 3 checks whether or not a jump is allowed. For example, a write instruction for writing the result of the logical operation (which corresponds to the instruction Y shown in FIG. 6 and to instruction (9) set forth in the Background Art section) cannot be omitted; therefore, the instruction preceding such an unomittable instruction is inhibited from being jumped. This is accomplished by including a jump inhibition to the instruction preceding the write instruction when the PLC program is assembled or compiled.

The jump condition checking unit 4 checks whether or not a jump should be implemented. This is accomplished in accordance with the following theory.

First, assuming that an instruction is disposed preceding AND-interrelated instructions and when the result of the logical operation of that instruction is "0", the results of the subsequent logical operations of the AND-interrelated instructions are "0" whatever the number of the AND-interrelated instructions may be. Thus, the AND-interrelated instructions are omitted, and the jump is performed over to an OR-interrelated instruction or the write instruction. What is referred to by the AND-interrelated instructions is intended to cover not only an AND instruction but also a NOT.AND instruction (which instruction corresponds to the logical relay B shown in FIG. 6).

Second, in the cases where the OR-interrelated instructions follow a particular instruction, if the result of the logical operation of the particular instruction is "1", the results of the following OR-interrelated instructions are always "1". In such cases, a jump can be performed over to the subsequent AND-interrelated instruction or the write instruction while omitting the executions of the OR-interrelated instructions.

In order to enable checking as to whether the jump can be performed, necessary information is incorporated into the instructions at the time when the PLC program is assembled or compiled.

The jump instruction execution unit 5 executes a jump instruction in accordance with conditions supplied from both the jump inhibition unit 3 and the jump condition checking unit 4. Of course, only when the above-mentioned two conditions are complied with at the same time, is the jump instruction is executed. If the conditions are not complied with, the processing immediately advances to the subsequent instruction. The number of instructions to be jumped is stored in an external memory 6.

The memory 6 stores the number of jump instructions to be jumped in the form of an integer. The theory as set forth with respect to the jump condition checking unit is equally applied to this number. Specifically, in the case where the AND-interrelated instructions follow, the number is the number of AND-interrelated instructions disposed ahead of the subsequent OR-interrelated or write instructions. On the other hand, in the case of OR-interrelated instructions, the number is a number of the OR-interrelated instructions disposed ahead of the subsequent AND-interrelated or write instructions.

In addition to those stated above, the processor 1 is provided with a plurality of functions for inputting and outputting addressing signals and data. Details of such functions will be described later. Only the functional description of the units which are closely related to the gist of the invention is presented here.

(2) Instruction Format of Processor

Figure 2A:
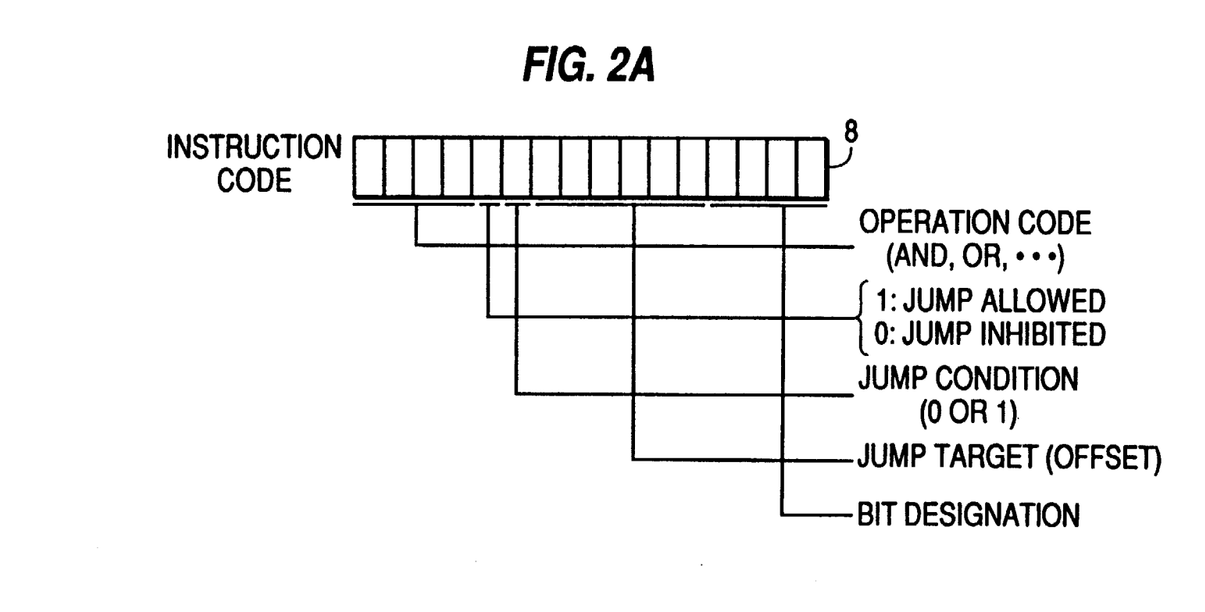
FIGS. 2A and 2B are diagrams indicating an instruction format of the processor.
Figure 2B:
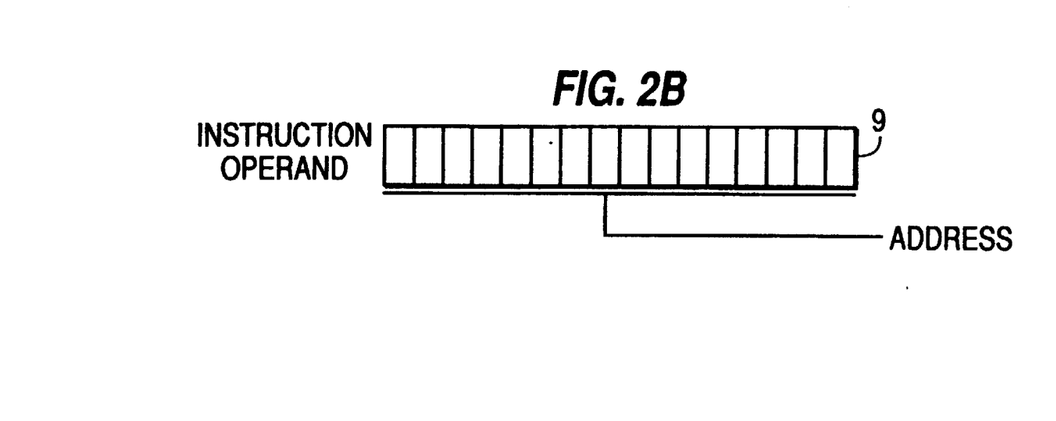

In FIG. 2, there is shown an instruction format of a processor according to this embodiment. An instruction is composed of two words. Denoted by numeral 8 is a high-order word providing an instruction code. Denoted by numeral 9 is a low-order word providing an instruction operand.

The instruction code 8 is provided with functions as shown in the figure. The left four bits are a processing code, which, for example, determines instructions, such as AND, OR, etc. The next bit discriminates whether or not jump is allowed. When the bit is "1", jump is allowed according to a condition; whereas, when the bit is "0", jump is inhibited. The latter corresponds to such instructions that cannot be omitted as in the case of a read instruction (corresponding to the instruction A in FIG. 6) and a write instruction (corresponding to Y in FIG. 6). Specifically, in the instruction preceding such unomittable instructions, the bit is rendered "0" to inhibit jumping. The "1" or "0" for this bit is determined when a source program is converted to an object program.

The next succeeding bit is for determining a jump condition, which is rendered "1" when the AND-interrelated instructions follow and is rendered "0" when the OR-interrelated instructions follow. Assuming that this bit value is Q and a result of a logical operation is S, then $$P = \bar{Q} \cdot S + \bar{Q} \cdot S.$$

When P is "1", a jump is carried out and when P is "0", jump is not carried out. This agrees with the result described previously setting forth that when the AND-interrelated instructions follow a jump is carried out when the result of an operation is "0" whereas the jump is not carried out when the result of the operation is "1". On the other hand, the foregoing description also complies with a requirement that when the OR-interrelated instructions follow, a jump is carried out when that bit is "1" whereas the jump is not carried out when that bit is "0". This bit is also determined when the source program is converted to the object program.

The succeeding six bits are representative of the number of instructions to be jumped. When the AND-interrelated instructions follow, this number is equal to the number of such AND-interrelated instructions. On the other hand, when the OR-interrelated instructions follow, this number is equal to the number of OR-interrelated instructions. Such numbers are determined when the source program is converted to the object program upon counting the number of instructions.

The last four bits are representative of bits corresponding to data to be processed. In this embodiment, data is composed of 16 bits per one word. The logical relay which is subjected to logical operation is represented by one-bit data which is specified by using these four bits.

An instruction operand is composed of 16 bits per word in which an address to be processed is specified. The corresponding bits are specified by the last four bits of the instruction code described above.

With the processor having the instruction system described above, unnecessary logic conditions can be omitted and thus the processing speed can be increased. Since the jump conditions, the number of jumps, etc. can be automatically processed by an assembler or a complier when the source program is converted to the object program, this does not cause to be an supplemental burden on a programmer.

The word organization and the number of bits can be arbitarily designed and altered, and a variety of word organizations and bit allocations may be made.

(3) Hardware Arrangement of the Processor

Figure 3:
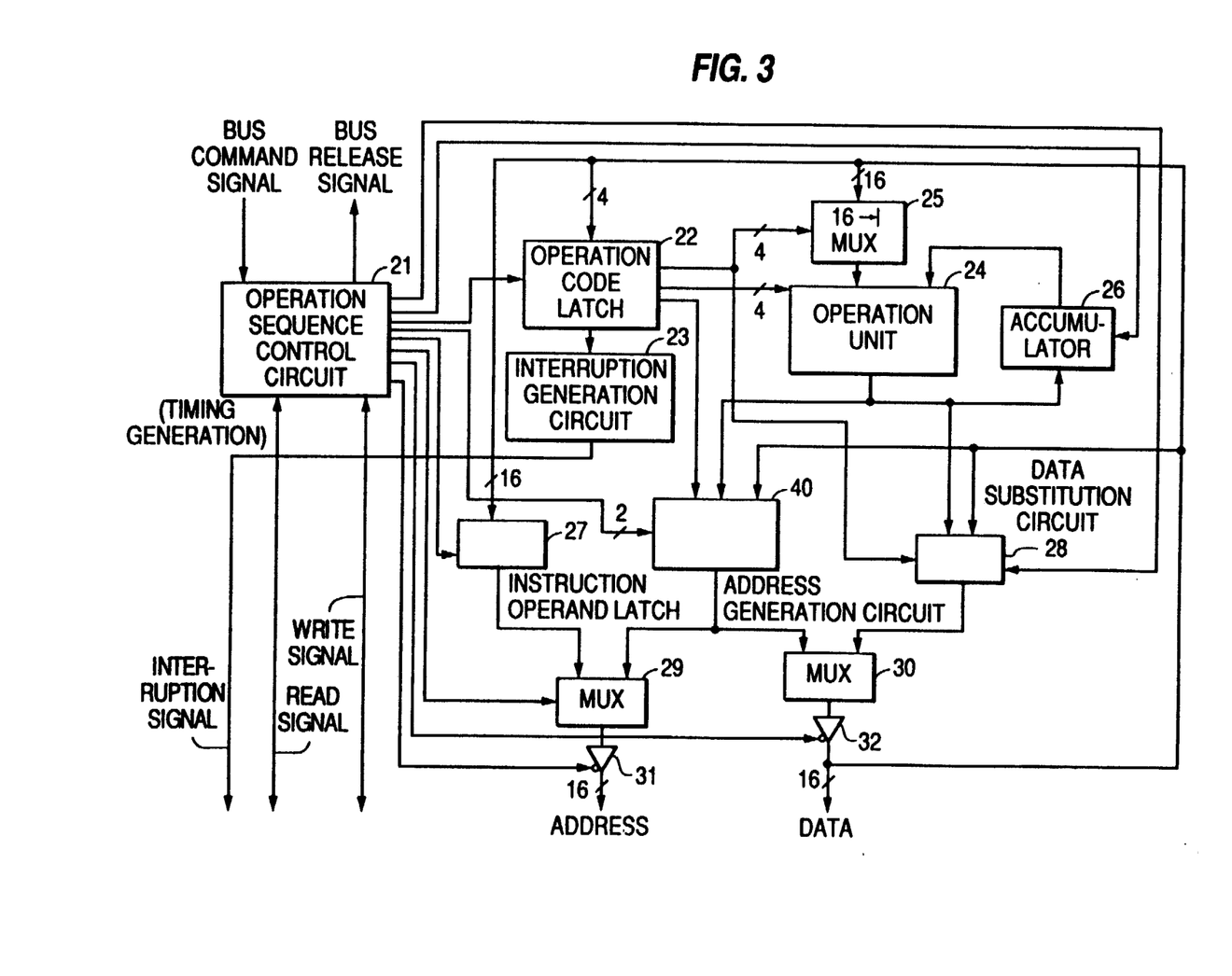
FIG. 3 is a diagram showing a hardware arrangement of the processor.

In FIG. 3, there is shown a hardware arrangement of the processor according to the present invention. Numerals indicated alongside signal lines with an oblique line segment represent the number of bits selected from a bus line for usage. For example, numeral 4 represents that four bits are used from the bus line. In the figure, an operation squence control circuit 21 performs timing controls for the entire processor.

An operation code latch 22 latches the operation code shown in FIG. 2. An interruption generation circuit 23 generates an interrupt signal when the operation code latched in the operation code latch is not a logical operation code, such as AND, OR, i.e. in the case of a specific subroutine. This interrupt signal is sent to an all-purpose processor for the purpose of processing other than the logical operations.

A multiplexer (MUX) 25 selects a bit to be processed in one word from the low-order four bits of the instruction code 8 (FIG. 2) and sends it to an operation unit. The operation unit 24 implements logical operations with respect to the bit selected by the multiplexer 25 in accordance with the operation code from the operation code latch 22.

An accumulator 26 temporarily stores the result of the logical operation. For example, when the instructions are:

RD A (19)

AND B (11)

the content of A is firstly stored in the accumulator 26, then the content of B is ANDed with the content A stored in the accumulator 26 and the resultant content is stored in the accumulator 26.

An instruction operand latch 27 latches the content of the instruction operand 9 (FIG. 2) and outputs it to the multiplexer 29 for fetching a corresponding address.

A data substitution circuit 28 synthesizes one-bit which has been subjected to operation processing when the write instruction is executed with another bit which has not been subjected to operation processing, and outputs a resultant bit. While the logical operation is processed by bits, the remainder bit is read out without subjecting it to processing operations and is written into the corresponding address together with the bit which has been subjected to operation processing.

An address generation circuit 40 controls addresses for performing jumping based on a relationship between the logical operation processings described previously and the subsequent instruction. Details of this address generation will be described later.

Multiplexers 29 and 30 select buses in response to a timing signal fed from the operation sequence control circuit 21. Denoted by numerals 31 and 32 are an address bus drive circuit and a data bus drive circuit, respectively.

The operation sequence control circuit 21 receives a bus command signal from an externally provided all-purpose processor and in response thereto issues a bus release signal indicating that the bus is available. This is because the externally provided all-purpose processor needs to use the bus when it executes a specific subroutine or the like. A read signal and a write signal for reading out of and writing into a memory connected to the processor are issued from the processor. With the arrangement as described above, the logical operations are processed with respect to the data stored in the memory (not shown).

(4) Address Generation Circuit

Figure 4:
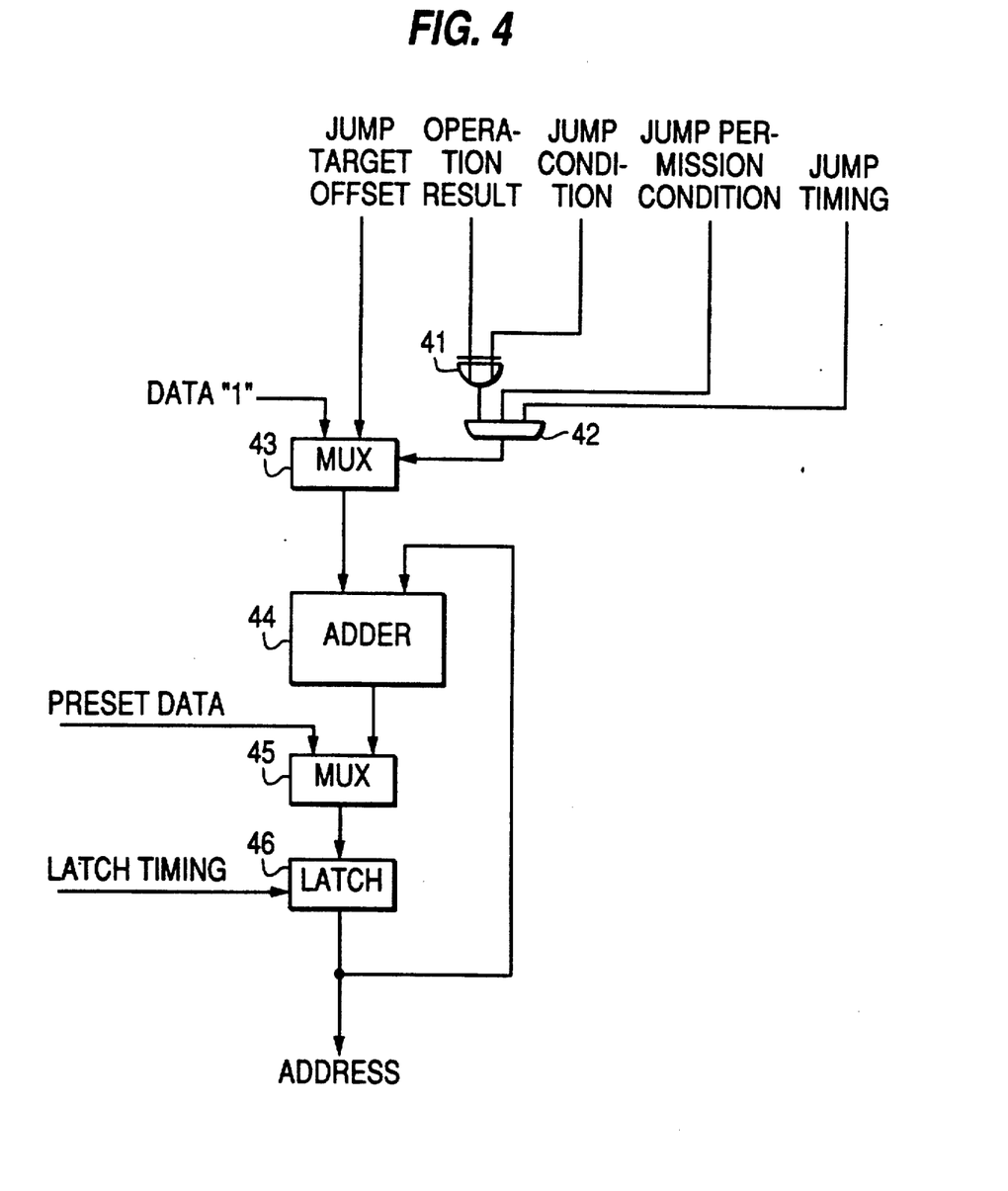
FIG. 4 is a diagram showing an address generating circuit of the processor.

The address generation circuit is shown in FIG. 4. In FIG. 4, an exclusive-OR circuit (hereinafter referred to as EOR circuit) 41 has one input terminal to which a logical operation result of the execution instruction is applied. The EOR circuit 41 has the other input terminal to which the jump condition signal is applied. As described in the column of "(2) Instruction Format of Processor", this jump condition signal is "1" in the case where the AND-interrelated instructions follow whereas the signal is "0" in the case where the OR-interrelated instructions follow. As described previously, the output of the EOR circuit 41 is represented by an equation:

$$P = \bar{Q} \cdot S + Q \cdot \bar{S}$$

When P is equal to "1", one of the conditions permitting a jump is complied with.

AND circuit 42 has a first input terminal to which the output of the EOR circuit 41 is applied, a second input terminal to which a jump permission condition signal is applied. When the jump permission condition signal is "0" jumping is inhibited because instructions which follow cannot be omitted, such as read and write instructions. The AND circuit 42 has a third input terminal to which a jump timing signal is applied which is outputted from the operation sequence control circuit 21 shown in FIG. 3. When these three conditions are met, the output of the AND circuit 42 is rendered "1".

A multiplexer 43 selects data "1" when the output of the AND circuit 42 is "0", in the case of which the address is counted up one by one. When the output of the AND circuit 42 is "1", a jump target offset (the number of instructions to be jump) is selected.

An adder 44 adds one to the address of the last instruction when the jump is not performed. When the jump is performed, the jump target offset is selected by the multiplexer 43 and the number of jumps is added to the address of the last instruction, thereby carrying out the jump. To a multiplexer 45, preset data is added. A latch 46 latches the address following the instruction which has operated. In this manner, the jumping address is generated by the address generation circuit.

With the arrangement of the processor as described, the unnecessary logical operations can be omitted and the speed of the logical processing can be increased. This is particularly effective in processing logical operations in the ladder format, since they contain a considerable number of unnecessary logical operations.

In the foregoing description, although a hardware arrangement has been described in which unnecessary logical processing is omitted, it is possible to achieve the same result by way of software. However, when processing is effected by software, a check instruction needs to be provided for checking whether or not jump should be performed, so that the goal tends to fluctuate depending upon a ratio of omittable instruction step number to an instruction number for jump checking.

(5) Arrangement of PLC

Figure 5:
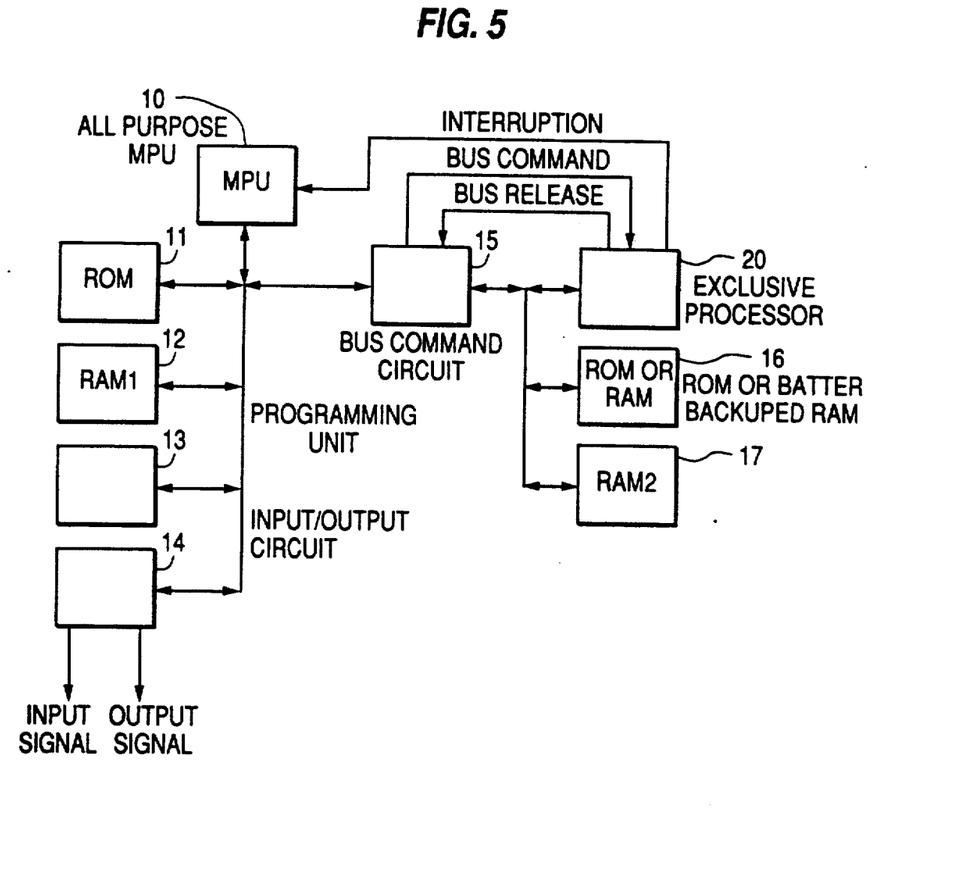
FIG. 5 is a block diagram showing a PLC.

In FIG. 5, there is shown a block diagram illustrating a PLC according to one embodiment of the present invention in which the above-described processor is used.

In FIG. 5, an all-purpose processor 10 as commonly used is provided, which carries out numerical computations, processings of function instructions, etc. precluding the overall control of the PLC and the logical operations. ROM 11 stores a control program for the entire PLC, according to which the PLC is controlled. A RAM 12 stores rewritable data, parameters which are necessary for controlling the entire PLC.

A programming unit 13 produces a program for controlling a subject to be controlled by the PLC, e.g. machine tool. The programming unit 13 is provided with a display unit for displaying a program and data, and an input unit for inputting the program and the data. As the display unit, a CRT, crystal liquid or the like are used. As the input unit, a keyboard, paper tape reader, cassette tape reader or the like are used. The programming unit 13 may be constructed to incorporate therein software for inputting and outputting such data. The software has a function for assembling or compiling the inputted source program to an object format. Such software may be loaded into the ROM 11, or it is possible to implement it with the use of the all-purpose processor 10 or with an exclusive processor provided in the programming unit 13.

An input/output circuit 14 is an interface connected to the subject to be controlled. This input/output circuit can further be connected to an upper-class host computer, computerized numerical controller, etc. A bus command circuit 15 is used for controlling the usage of the bus between the all-purpose processor 10 and an exclusive processor 20 to be described later.

The exclusive processor 20 as described with reference to FIGS. 1 and 2 exclusively executes logical processings. In order to transfer data from the all-purpose processor 10 to the exclusive processor 20, the all-purpose processor 10 sends a command to the bus command circuit 15 requesting the use of the bus in the all-purpose processor 20. The bus command circuit 15 in turn sends this command to the exclusive processor 20. Upon receipt of this command, the exclusive processor 20 releases the bus and permits the all-purpose processor 10 to use it at the time when the instructions which the exclusive processor is executing has terminated. When the exclusive processor 20 receives an instruction other than the logical operations during execution of the instructions, it causes the all-purpose processor 10 to interrupt and transfers that instruction to the all-purpose processor 10 to enable it to execute the instruction. In this fashion, since the exclusive processor executes only logical operations, it operates at a high speed.

A memory 16 stores a program (ladder diagram) which the exclusive processor 20 processes, for which a ROM or a battery-backuped RAM is used. When the initial program is incomplete and debugging is performed, the program is stored in the battery-backuped RAM and is corrected. Upon completion of the debugging, the complete program is loaded into the ROM for use.

RAM 17 stores data, which is needed by the exclusive processor 20 to execute the program loaded in the memory 16, and logical data to be subjected to logical processings.

The exclusive processor 20 executes the program loaded in the memory 16. If it calls for logical processing, execution is immediately started. If the program is not directed to logical operations but to special function instructions, an interruption signal is generated to thereby cause the all-purpose processor 10 to interrupt. In response to the interrupt signal, the all-purpose processor 10 issues a command to the bus command circuit 15 requesting the use of the bus. The bus command circuit 15 issues the bus command signal to the exclusive processor 20. In response to the signal from the bus command circuit 15, the exclusive processor 20 releases the bus at a break of the instruction and outputs the bus release signal to the bus command circuit 15. As a result, the all-purpose processor 10 is capable of using the bus of the exclusive processor 20 and executes the special function instruction upon reading it out of the memory 16. When the execution of this instruction is terminated, the control again returns to the exclusive processor 20 and the latter again executes the logical processings.

With the arrangement described above, the ladder diagram is executed in the following manner. First, the all-purpose processor 10 reads the input signal from the input/output circuit 14, and the signal thus read out is written into RAM 17. Then, the exclusive processor processes the logical operations of the input data written in RAM 17 in accordance with the program (ladder diagram) loaded in memory 16. The resultant data is written into another location of RAM 17. When the program is terminated, the all-purpose processor 10 reads the resultant data out of the RAM 17 and outputs it through the input/output circuit 14. By the repetition of the above operations, the ladder diagram is carried out. In the exclusive processor 20 as used, unnecessary logical operations are excluded and execution of only logical operations takes place, whereby the processing speed can further be increased.

As described, according to the first aspect of the invention, it is arranged so that unnecessary logical operations are omitted in conformity with the kinds of instructions and the result of the logical operation. The checking to this effect is implemented simultaneously with the execution of the instructins. As a result, the logical processings can be performed at a high speed.

According to the second aspect of the invention, the processor as described in conjunction with the first aspect of the invention is used as an exclusive processor for executing the logical operations, and another processor is employed for executing the remaining instructions, whereby a PLC operable at high speeds is obtained.

I claim:

1. A programmable logic controller processor for carrying out logical operations in accordance with a predetermined program having instructions, comprising:
   logic operation means for executing a logical operation of the instructions to produce a result for each executed instruction;
   jump inhibition means for inhibiting a jump of a subsequent instruction when a current instruction supplied to said logic operation means indicates the subsequent instruction is not to be jumped;
   jump condition checking means for checking whether the jump is to be executed based on the result of the logical operation for the current instruction and a signal indicating a condition of the subsequent instruction; and
   jump execution means for executing the jump after the logical operation of the current instruction if uninhibited by said jump inhibition means and indicated by said jump condition checking means.

2. A programmable logic controller processor as recited in claim 1, wherein the programmable logic controller processor is operatively connected to an external memory for storing a jump number indicating a number of subsequent instructions to be jumped, and
   wherein said jump instruction executes the jump in accordance with the jump number stored in the external memory.

3. A programmable logic controller processor as recited in claim 1, wherein said jump condition checking means determines that the jump should be executed if the result of the logical operation is a first logic level and a subsequent logical operation of the subsequent instruction is an AND instruction, and
   wherein said jump condition checking means determines that the jump should be executed if the result of the logical operation is a second logic level and the subsequent logical operation is an OR instruction.

4. A programmable logic controller processor as recited in claim 3, wherein said programmable logic controller processor performs logical operations based on the instructions previously programmed, each instruction having an instruction code including a jump inhibit flag, included in a programmable logic control program, and wherein said jump inhibition means inhibits jumping of predetermined program instructions based upon the jump inhibit flag stored in the instruction code of the instructions.

5. A programmable logic controller processor as recited in claim 4, wherein the instruction code of the instructions includes a jump condition flag indicating whether the subsequent logical operation is one of AND and OR.

6. A programmable logic controller processor as recited in claim 5,
   wherein said jump instruction execution means executes the jump if the jump inhibit flag is of the second logic level, the jump condition flag is of the second logic level, and the result of the logical operation is of the first logic level, and
   wherein said jump instruction execution means executes the jump if the jump inhibit flag is of the second logic level, the jump condition flag is of the first logic level, and the result of the logical operation is of the second logic level.

7. A programmable logic controller processor as recited in claim 6, wherein the jump inhibit flag and the jump condition flag are incorporated into the instruction code of the instructions during assembly or compilation of the programmable logic control program.

8. A programmable logic controller processor as recited in claim 7, wherein the instruction code of the instructions further incorporates a jump number offset indicating the number of instructions to be jumped.

9. A programmable logic controller having at least two processors for processing logical operations and other than logical operations, the logical operations processed in accordance with a predetermined program having instructions, comprising:
   an exclusive programmable logic controller processor for executing the logical operations, said exclusive programmable logic controller processor including:
      logic operation means for executing a logical operation of the instructions to produce a result for each executed instruction,
      jump inhibition means for inhibiting a jump of a subsequent instruction when a current instruction supplied to said logic operation means includes a first code indicating that the subsequent instruction is not to be jumped,
      jump condition checking means for checking whether the jump is to be executed based on the result of the logical operation for the current instruction and a second code in the current instruction indicating a condition of the subsequent instruction, and
      jump execution means for executing the jump after the logical operation of the current instruction in response to conditions of both said jump inhibition means and said jump condition checking means; and
   a second processor, operatively connected to said exclusive programmable logic controller processor, for executing processing concerning the other than logical operations.

10. A method for processing a predetermined program having program instructions, comprising the steps of:
   (a) executing a logical operation of a current program instruction having a jump condition flag corresponding to a subsequent program instruction and a jump inhibit flag;

(b) generating a current logical result of the current program instruction; and (c) executing a jump in place of the subsequent program instruction in dependence upon the current logical result, the jump inhibit flag and the jump condition flag.

11. A method as recited in claim 10, wherein said step (c) includes the following substeps:

(ci) determining if the jump inhibit flag corresponding to the subsequent program instruction is of a second logic level;

(cii) determining if the jump condition flag corresponding to the subsequent program instruction is of the second logic level;

(ciii) determining if the current logical result is of a first logic level;

(civ) executing the jump instruction if substeps (ci), (cii) and (ciii) are affirmative; and (cv) executing the jump instruction when substeps (cii) and (ciii) are negative and substep (ci) is affirmative.

12. A method as recited in claim 11, wherein the processor processes program instructions of a programmable logic control program, and wherein said method further comprises the step of:

(d) setting the jump condition flag and the jump inhibit flag corresponding to the subsequent program instruction in the current program instruction during compilation of the programmable logic control program.

* * * * *